United States Patent [19]

Shimasaki et al.

[11] Patent Number: 4,822,059
[45] Date of Patent: Apr. 18, 1989

[54] DUAL LIP SEAL DEVICE

[75] Inventors: Keiichi Shimasaki; Hiroshi Kanayama; Hiroshi Kanemitsu; Makoto Shibata; Satoshi Asahi; Akira Takenaka, all of Aichi, Japan

[73] Assignee: Taiho Kogyo Co., Ltd., Aichi, Japan

[21] Appl. No.: 196,700

[22] Filed: May 20, 1988

[30] Foreign Application Priority Data

Jul. 24, 1987 [JP] Japan .................. 62-184966

[51] Int. Cl.$^4$ ............................ F16J 15/32
[52] U.S. Cl. ......................... 277/152; 277/134; 277/215
[58] Field of Search ............... 277/134, 152, 153, 215

[56] References Cited

U.S. PATENT DOCUMENTS

| | | | |
|---|---|---|---|
| 2,329,028 | 9/1943 | Austin | 277/152 |
| 2,990,220 | 6/1961 | Malone | 277/152 X |
| 3,275,331 | 9/1966 | Mastrobattista et al. | 277/152 X |
| 3,445,121 | 5/1969 | Lineker | 277/134 X |
| 3,857,156 | 12/1974 | Clark . | |
| 3,929,341 | 12/1975 | Clark . | |
| 4,093,241 | 6/1978 | Muntjanoff et al. | 277/152 X |
| 4,411,478 | 10/1983 | Olschewski et al. | 277/152 X |
| 4,623,153 | 11/1986 | Nagasawa . | |
| 4,635,946 | 1/1987 | Stanley | 277/152 X |

FOREIGN PATENT DOCUMENTS

55-30542  3/1980  Japan .

Primary Examiner—Robert S. Ward
Attorney, Agent, or Firm—Sughrue, Mion, Zinn, Macpeak & Seas

[57] ABSTRACT

A lip seal device for sealing the gap between a housing and a rotary shaft comprises a case surrounding the rotary shaft, a plurality of lip seals fitted inside the case and including at least two lip seals, support means for holding the lip seals on the outer circumferential portions thereof and seal means located on the outside of the circumferential surface of the case. The inner circumferential portions of the lip seals are curved toward the sealed fluid and have a sealing surface in contact with the outside circumferential surface of the rotary shaft. The contact pressure of the lip seal furthest from the sealed fluid is lower than the contact pressure of the lip seal closest to the sealed fluid.

23 Claims, 4 Drawing Sheets

FIG. 9

DUAL LIP SEAL DEVICE

BACKGROUND OF THE INVENTION

The present invention relates to a lip seal device having a lip seal in sliding contact with a shaft. A lip seal device having a plurality of lip seals has been well known. Such a lip seal device usually comprises a cylindrical case, and first and second lip seals whose outer circumferential portions are attached to the cylindrical case and whose inner circumferential portions are curved toward a sealed fluid and put in sliding contact with the outside circumferential surface of a shaft extending through the cylindrical case. The first lip seal is located nearer the sealed fluid than the second lip seal so that the sealed fluid having leaked along the first lip seal is blocked by the second lip seal. The first and the second lip seals have substantially the same constitution and have their inner circumferential portions put in sliding contact with the shaft by tight contact forces of substantially the same magnitude. Nagasawa. U.S. Pat. No. 4,623,153, shows such a lip sealing device having two lip seals. However. Nagasawa does not distinguish between the contact pressure of the respective lip seals, as does the subject invention.

Since there is a large fluid pressure difference between the two sides of the first lip seal, which is located nearest the sealed fluid, the first lip seal needs to be in sliding contact with the shaft by a strong contact force. In contrast, since the second lip seal is for blocking the sealed fluid that has leaked along the first lip seal, the second lip seal does not need to be in sliding contact with the shaft by a strong contact force. Typically, the second lip seal is in sliding contact with the shaft by more than a necessary contact force. As a result, the sliding contact resistance of the second lip seal to the rotation of the shaft is increased, and the life of the second lip seal is shortened. These are drawbacks of the prior devices.

SUMMARY OF THE INVENTION

The present invention was made in order to eliminate the above-mentioned drawbacks.

Accordingly, it is an object of the present invention to provide a lip seal device which comprises a cylindrical case and first and second lip seals and in which the second lip seal is put in sliding contact with a shaft by a weaker contact force than the first lip seal. In the lip seal device having the above-described constitution, the sealing function of the second lip seal is sufficient, the sliding contact resistance of the second lip seal to the rotation of the shaft is reduced, and the life of the second lip seal is lengthened

DETAILED DESCRIPTION OF EXEMPLARY EMBODIMENTS

Embodiments of the present invention are hereafter described in detail with reference to the drawings attached hereto.

Figure 1:
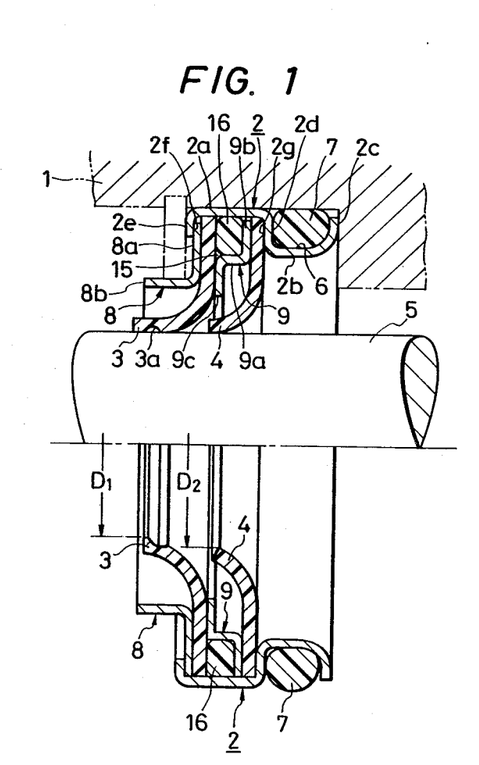
FIG. 1 shows a sectional view of a lip seal device which is an embodiment of the present invention.

FIG. 1 shows a lip seal device which is one of the embodiments and basically comprises a cylindrical case 2 secured to a housing 1, and first and second lip seals 3 and 4. The inner circumferential portions of the first and second lip seals 3 and 4 are curved toward a sealed fluid or leftward (as the FIG. 1) along a rotary shaft 5 extending through the case 2, so that the inner edges of the lip seals are put in sliding contact with the outside circumferential surface of the rotary shaft by the elasticity of the lip seals to seal the rotary shaft.

The first and the second lip seals 3 and 4 are made of the same material such as a material obtained by adding 15% by weight of graphite to polytetrafluoroethylene. When the first and the second lip seals 3 and 4 are in a free state before being put in actual use, the inside diameter $D_2$ of the second lip seal is set to be larger than that $D_1$ of the first lip seal so that the contact force of the second lip seal on the rotary shaft 5 is weaker than that of the first lip seal on the rotary shaft.

The surface of the first lip seal 3, which is in sliding contact with the rotary shaft 5 is provided with a circumferential annular groove 3a which acts to place the surface of the first lip seal in uniform contact with the rotary shaft to prevent the sealed fluid from leaking, particularly when the rotation of the shaft is stopped. If the circumferential annular groove 3a were not provided, the axial length of the sliding contact surface of the first lip seal 3 on the rotary shaft 5 would vary from part to part in the circumferential direction of the rotary shaft to cause the contact force of the lip seal on the rotary shaft to become non-uniform in the circumferential direction. The non-uniformity of the contact force would result in leakage of the sealed fluid, particularly when the rotation of the rotary shaft is stopped.

The cylindrical case 2 has a large-diameter portion 2a and a small-diameter portion 2b. The right-hand end (as to FIG. 1) of the small-diameter portion 2b is bent outwardly in the radial direction of the case 2 so that a flange 2c is formed. Annular groove 6 is defined on the outside circumferential surface of the case by the flange, the small-diameter portion 2b and a wall 2d located between the small diameter portion and the large-diameter portion 2a. A sealing member 7 is fitted in the annular groove 6 to seal the gap between the housing 1 and the case 2. The left-hand end (as to FIG. 1) of the large-diameter portion 2a is bent inwardly in the radial direction of the case 2 so that a crimped portion 2e is formed. Engaging surfaces 2f and 2g facing each other in the axial direction of the case are constituted by the crimped portion 2e and the wall 2d respectively. Between the engaging surfaces 2f and 2g, a spacer 8, the first lip seal 3, a cylindrical spacer 9 and the second lip seal 4 are sequentially interposed in that order from the crimped portion 2e and coupled together by the engaging surfaces.

The spacer 8 is made of a metal, and comprises a radial portion 8a located in contact with the engaging surface 2f, and a cylindrical portion 8b extending leftwardly (as to FIG. 1) from the radial portion in the axial direction of the lip seal device. The inner edge of the first lip seal 3 which projects outside the crimped portion 2e of the case 2 in the axial direction of the lip seal device when the first lip seal is in a free state before being put in actual use. is covered with the cylindrical portion 8b of the spacer 8 to protect the inner edge of the first lip seal from damage when the lip seal device is assembled or conveyed.

In other words, the inner circumferential edge of the first lip seal 3 projects inwardly in the axial direction of the lip seal device more than the large-diameter portion 2a of the cylindrical case 2 because the axial length of the large-diameter portion is set to be small. However, the spacer 8 is provided with the cylindrical portion 8b which projects in the axial direction of the device more than the large-diameter portion 2a and covers the inner circumferential edge of the first lip seal to protect the inner circumferential edge from damage at the time of the assembly or conveyance of the lip seal device. For that reason, the axial length of the large-diameter portion 2a of the case 2 can be made as small as possible without considering the length of the projection of the inner circumferential edge of the first lip seal 3. As a result, even if there are restrictions such as the fact that the axial length of the housing 1 is small, the lip seal device can be installed in the housing more easily than in a conventional art.

The cylindrical spacer 9 is made of a metal, and comprises a cylindrical portion 9a, a flange 9b formed at the right-hand end (as to FIG. 1) of the spacer and extending outwardly in the radial direction of the spacer, and another flange 9c formed at the left-hand end (as to FIG. 1) of the spacer and extending inwardly in the radial direction of the spacer. A sealing member 16 is provided in a gap 15 defined between the outside circumferential surface of the cylindrical portion 9a of the spacer 9 and the inside circumferential surface of the case 2. The sealing member 16 is compressed between the inside circumferential surface of the case 2 and the outside circumferential surface of the cylindrical portion 9a of the spacer 9 and also between the side surface of the outer circumferential portion of the first lip seal 3 and the flange 9b of the spacer 9, to seal the gaps therebetween. Accordingly the further leaking of the sealed fluid having leaked between the case 2 and the spacer 8, between the first lip seal 3 and the spacer 8 and/or between the first seal and the case is prevented.

The sealed fluid is thus blocked by the first lip seal 3 and the sealing member 16. Particularly, the inner circumferential portion of the first lip seal 3 is put in sliding contact with the rotary shaft 5 by a sufficiently tight contact force so as to prevent the sealed fluid from leaking between the first lip sea) and the rotary shaft. Even if the sealed fluid slightly leaks between the first lip seal 3 and the sealing member 16, the fluid is blocked by the second lip seal 4. Although the second lip seal 4 is in sliding contact with the rotary shaft 5 with a lower contact pressure than the first lip seal 3, the leaked fluid is sufficiently blocked by the second lip seal because the pressure of the fluid having leaked along the first lip seal is low.

Although the sealed fluid may leak between the first lip seal 3 and the sealing member 16, further fluid leakage is blocked by the tight contact of the second lip seal 4 and the cylindrical spacer 9 and that of the second lip seal and the case 2 as the pressure of the leaked fluid is low.

Since the contact force of the second lip seal 4 on the rotary shaft 5 is set to be weaker than that of the first lip seal 3 on the rotary shaft the sliding contact resistance of the second lip seal to the rotation of the rotary shaft is reduced while the sealing performance of the second lip seal is kept sufficient. Further, the life of the second lip seal 4 is lengthened because the contact force thereof on the rotary shaft 5 is set to be weaker.

Figure 2:
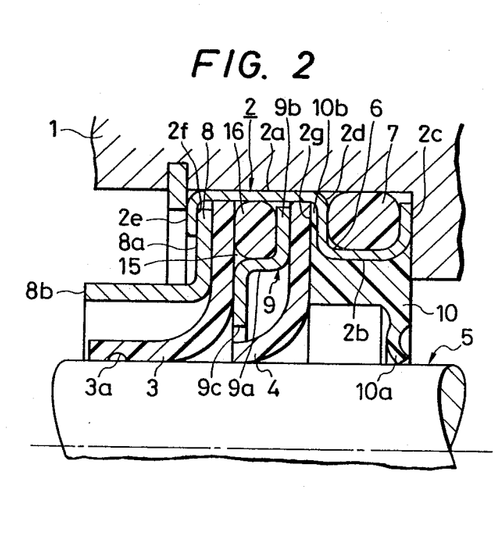
FIG. 2 shows a sectional view of a lip seal device which is another embodiment of the present invention.

FIG. 2 shows a lip seal device according to another embodiment including a dust seal 10 which is not provided in the lip seal device shown in FIG. 1. The dust seal 10 is adhered to the inside circumferential surface of the small-diameter portion 2b of a cylindrical case 2 and the engaging surface 2g thereof by vulcanization or adhesion. The dust seal 10 has a dust lip 10a which is formed at the right-hand end (as to FIG. 2) of the inside circumferential surface of the dust seal and is in sliding contact with the outside circumferential surface of a rotary shaft 5 so as to prevent the dust in the atmosphere from entering between the sliding surfaces of a second lip seal 4 and the rotary shaft. The radial portion 10b of the dust seal 10, which extends along the engaging surface 2g, prevents a sealed fluid from leaking therealong. The dust seal 10 does not necessarily need to be adhered to the case 2, but may be otherwise disposed so that the radial portion 10b extending along the engaging surface 2g of the case 2 has a diameter slightly larger than that of the inside surface of the small diameter portion 2b of the case. The other portion of the dust seal is removably fitted inside the small-diameter portion.

In the lip seal device shown in FIG. 2, two lip seals 3 and 4 are pinch-held by the engaging surfaces 2f and 2g of the case 2, spacers 8 and 9 and the dust seal 10. Since the rigidity of the spacers 8 and 9 is high and the radial portion 10b of the dust seal 10 has a low rigidity but a small thickness, both the lip seals 3 and 4 can be secured to the case 2 by a sufficient pinch-holding force acting from the engaging surfaces 2f and 2g, for a long period of time, so as to prevent the lip seals from being rotated along with the rotation of the rotary shaft 5.

When the lip seals 3 and 4, and so forth, are pinch-held by the engaging surfaces 2f and 2g, a sealing member 16, provided between the outside circumferential surface of the cylindrical portion 9a of the cylindrical spacer and the inside circumferential surface of the case 2, receives only a pinch-holding force determined by the axial length of the cylindrical portion 9a. Therefore, the sealing member 16 does not receive a compressive force stronger than necessary. For that reason, an optimal compressive force can be applied to the sealing member 16 by appropriately setting the axial length of the cylindrical portion 9a of the spacer 9 and the thickness of the cylindrical portion relative to the inside diameter of the case 2, so as to maintain sure sealing performance for a long period of time.

The sealed fluid having leaked along the lip seal 3 is blocked by the other lip seal 4. Further leakage of the fluid between the lip seal 4 and the cylindrical spacer 9 and between the lip seal 4 and the case 2, is blocked by the radial portion 10b of the dust seal 10. Since the radial portion 10b of the dust seal 10 is strongly compressed by the pinch-holding force directly, the radial portion is likely to deteriorate. However since the pressure of the sealed fluid having leaked along the lip seal 3 is low, the fluid is less likely to leak along the radial portion 10a even if it deteriorates.

In the lip seal device shown in FIG. 2, the inside diameter $D_2$ of the second lip seal 4 is made larger than the inside diameter $D_1$ of the first lip seal 3 in a free state before the lip seals are put in actual use. Therefore, the tight contact force of second lip seal on the rotary shaft 5 is set to be weaker than that of the first lip seal on the rotary shaft. However the present invention is not confined thereto but may be otherwise embodied so as to make the flexibility of the second lip seal 4 higher than that of the first lip seal 3 such that the tight contact force of the second lip seal on the rotary shaft may be weaker than that of the first lip seal on the rotary shaft. For example, the first lip seal 3 may be made of a material obtained by adding 15% by weight of graphite to polytetrafluoroethylene, and the second lip seal 4 may be made of a material obtained by adding 5 to 10% by weight of graphite to polytetrafluoroethylene, to render the flexibility of the second lip seal higher than that of the first lip seal.

Figure 3:
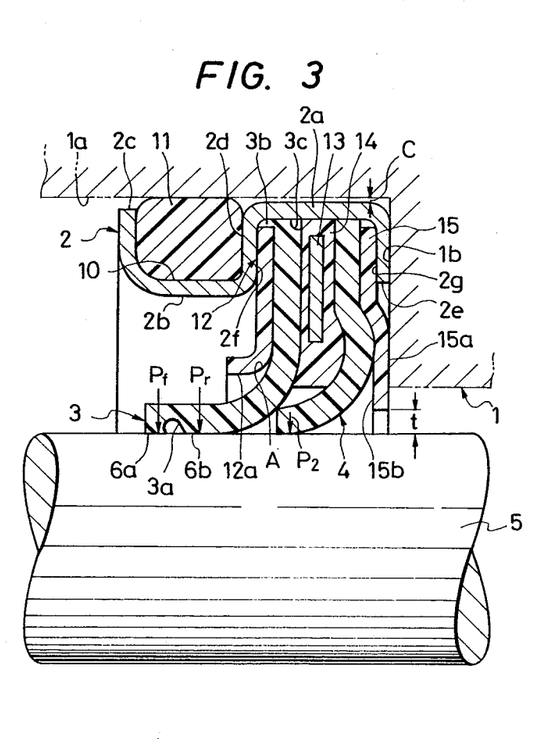
FIG. 3 shows a sectional view of a lip seal device which is still another embodiment of the present invention.

FIG. 3 shows a lip seal device which is still another embodiment and comprises a cylindrical case 2 fitted in the hole 1a of a housing 1, and a first lip seal 3 and a second lip seal 4 whose outer circumferential portions are attached to the case 2. The inner circumferential portions of the first and the second lip seals 3 and 4 are curved toward a sealed fluid, or leftward (as to FIG. 3), along a rotary shaft 5 extending through the case 2, so that the inner edges of the lip seals are put in sliding contact with the outside circumferential surface of the rotary shaft by the elasticity of the seal lips and the pressure of the sealed fluid to seal the rotary shaft.

Figure 4:
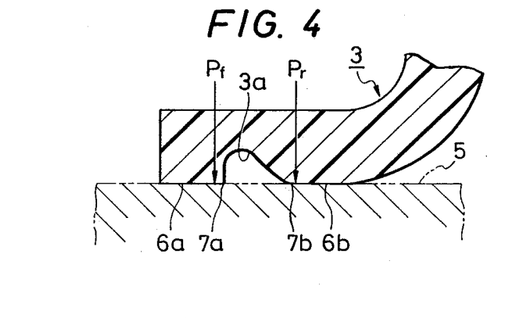
FIG. 4 shows an enlarged view of a major part of the lip seal device shown in FIG. 3.

The first lip seal 3, which is a left-hand lip seal (as to FIG. 3) located on the side of the sealed fluid is provided with a circumferential continuous annular groove 3a in the sliding contact surface of the lip seal on the rotary shaft 5 so that the lip seal has a first sealing surface 6a at the left (as to FIG. 3) of the annular groove and a second sealing surface 6b at the right (as to FIG. 3) of the annular groove. As shown in FIG. 4, the cross section of the annular groove 3a is shaped as a semicircle slightly deformed toward the sealed fluid. The corner of the joint 7a of the annular groove 3a and the first sealing surface 6a is made nearly rectangular so that the edge of the corner of the joint is as sharp as possible. The corner of the joint 7b of the annular groove 3a and the second sealing surface 6b is shaped as a continuously smooth curve.

A procedure such as appropriately setting the width depth and position of the annular groove 3a is performed so that the tight contact force Pf of the first sealing surface 6a on the rotary shaft 5 in front of the annular groove is weaker than the contact force Pr of the second sealing surface 6b on the rotary shaft behind the groove. The tight contact force $P_2$ of the second lip seal 4 on the rotary shaft 5 is designed to be weaker than that Pf of the first sealing surface 6a on the rotary shaft by setting the inside diameter of the second lip seal to be larger than that of the first lip seal 3 in a free state before the lip seals are put in actual use.

The cylindrical case 2 comprises a large-diameter portion 2a and a small-diameter portion 2b. The outside diameter of the large-diameter portion 2a is made smaller by a prescribed quantity than the diameter of the hole 1a of the housing 1 so that the case can be loosely fitted with a prescribed clearance C in the hole. The left-hand end (as to FIG. 3) of the small-diameter portion 2b is bent outwardly in the radial direction of the lip seal device so that a flange 2c is formed. An annular groove 10 is defined on the outside circumferential surface of the case 2 by the flange, the small-diameter portion 2b and a wall 2d located between the small-diameter portion and the large-diameter portion 2a. A sealing member 11 made of an O-ring is fitted in the annular groove 10. As a result, when the case 2 is loosely fitted with the clearance C in the hole 1a of the housing 1, the sealing member 11 is press-fitted in the hole 1a so that the case 2 is fixed to the housing and the sealed fluid is prevented from leaking rightward (as to FIG. 3) through the clearance. At that time, the center line of the sealing member 11 and that of the annular groove 3a of the first lip seal 3 are located in a vertical plane perpendicularly intersecting the axis of the rotary shaft 5.

Figure 3A:
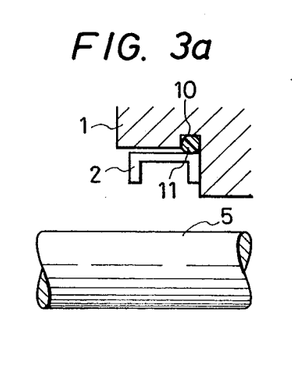
FIG. 3a shows a sectional view of a lip seal device of a further embodiment of the present invention.

FIG. 3a shows an alternate to FIG. 3. Here the annular groove 10 is formed in the housing rather than in the case 2. The sealing member 11 made of an o-ring is fitted in the annular groove 10.

The right-hand end (as to FIG. 3) of the large-diameter portion 2a of the case 2 is bent inwardly in the radial direction of the lip seal device so that a crimped portion 2e is formed. Engaging surfaces 2f and 2g facing each other in the axial direction of the lip seal device are constituted by the wall 2d and the crimped portion 2e, respectively. Between the engaging surfaces 2f and 2g, a plate 12, the first lip seal 3, a sealing member 14 embedded with a rigid plate 13 such as a metal washer, the second lip seal 4 and a plate 15 are sequentially interposed in that order and pinch-held together side by side in the axial direction of the lip seal device by the engaging surfaces 2f and 2g.

The plate 12 is made of a metal so that the outside diameter thereof is smaller by a prescribe quantity than the inside diameter of the large-diameter portion 2a of the case 2. A projection 3b, formed in the outer circumferential portion of the first lip seal 3 and extending toward the sealed fluid, is engaged on the outside circumferential surface of the plate 12 to prevent the first lip seal from coming off. The inner circumferential portion of the plate 12 is curved toward the sealed fluid or leftward (as to FIG. 3) along the rotary shaft 5 so that a cylindrical portion 12a is formed at the inner circumferential edge of the plate. If the inner circumferential portion of the plate 12 were only curved in the form of a truncated cone toward the sealed fluid as shown by an imaginary line A in FIG. 3, the edge of the inner circumferential portion of the plate would likely damage the first lip seal 3 at the time of the assembly, conveyance or the like of the lip seal device. Since the cylindrical portion 12a is actually formed at the edge of the inner circumferential portion of the plate 12, the edge is prevented from damaging the first lip seal 3 at the time of the assembly, conveyance or the like of the lip seal device.

Figure 5:
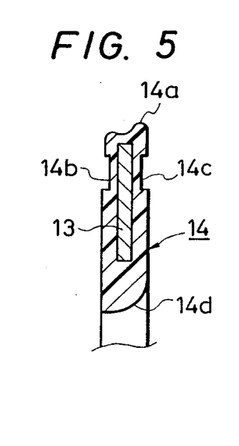
FIG. 5 shows a sectional view of another major part of the lip seal device shown in FIG. 3.

FIG. 5 shows the state of the sealing member 14 not yet disposed in the lip seal device. The sealing member 14 is made of an elastic material such as rubber and provided with an annular projection 14a located on a part of the outside circumferential surface thereof and extending outwardly in the radial direction of the lip seal device to surely seal the case 2. Both sides of the sealing member 14 have annular grooves 14b and 14c for absorbing the elastic deformation of the annular projection 14a when the sealing member is fitted in the case 2 and pinch-held by the engaging surfaces 2f and 2g.

As shown in FIG. 3, the outer circumferential portion of the first lip seal 3 is provided with an annular groove 3c opposite the projection 3b so that the annular groove absorbs the elastic deformation of the annular projection 14a of the sealing member 14. The projection 3b and annular groove 3c of the outer circumferential portion of the first lip seal 3 can be simultaneously made by deforming the outer circumferential portion through extrusion in the axial direction of the first lip seal.

The inside circumferential surface of the sealing member 14 is a curved surface 14d extending along the curved surface of the second lip seal 4, which is located at the side of the sealed fluid. The curved surface 14d of the sealing member 14 prevents the inner circumferential portion of the second lip seal 4 from being displaced leftwardly (as to FIG. 3) in the axial direction of the lip seal device more than a necessary quantity, so as to put the inner circumferential edge of the second lip seal in contact with the first lip seal 3 to support it.

The plate 15 located at the end of the case 2 opposite the sealed fluid is made of a metal and has its central portion 15a formed as a dish and projecting rightwardly (as to FIG. 3) so that a recess 15b having a prescribed form is provided on the left-hand side of the central portion to increase the rigidity of the plate. The right-hand side of the projecting central portion 15a and that of the crimped portion 2e of the case 2 are located in the same plane perpendicular to the axis of the rotary shaft 5 and are simultaneously put in contact with the wall surface 1b of the housing 1. The gap t between the inside circumferential surface of the plate 15 and the outside circumferential surface of the rotary shaft 5 is set to be small so as to prevent the inner circumferential portion of the second lip seal 4 from accidentally being bent back rightwardly. As an alternative, the plate 15 may be made of an initially flat metal sheet located at the end of the case 2 opposite the sealed fluid. The recess is formed by the pressure exterted, on the inside of the plate created by the crimping of the portion 2e so that the right-hand side of the plate is located in the same plane as that of the crimped portion 2e of the case.

When the plate 12, the first lip seal 3, the sealing member 14, the second lip seal 4 and the plate 15 are pinch-held by the engaging surfaces 2f and 2g a part of the outer circumferential portion of the sealing member 14 made of the elastic material such as rubber is pushed inwardly in the radial direction of the lip seal device to deform the inner circumferential portion of the sealing member to thereby push and deform the lip seals 3 and 4 in the axial direction.

Since the plate 12, located at the side of the sealed fluid, has a cylindrical portion 12a at the axis of the plate, the rigidity of the plate is high enough to deform the inner circumferential portion of the sealing member 14 in the direction opposite to the sealed fluid. If the plate 15 located at the end of the case 2 opposite the sealed fluid were simply made of a flat sheet, the central portion of the plate would be conically deformed by the deformation of the inner circumferential portion of the sealing member 14 through the action of the second lip seal 4. The quantity of the deformation of the central portion of the plate would likely vary from device to device. Therefore, the degree of contact between the second lip seal and the rotary shaft 5 and between the rotary shaft and the first lip seal 3 located in contact with the second lip seal would fluctuate, to thereby deteriorate the sealing performance of the lip seal device. In reality, since the central portion of the plate 15 projects in the direction opposite to the sealed fluid so that the recess 15b, having the prescribed form, is made on the plate at the side opposite the projection, the rigidity of the plate is increased and the elastic deformation of the sealing member 14 is restricted to a substantially constant quantity by the capacity of the recess. For that reason, the degree of contact between the respective lip seals 3 and 4 and the rotary shaft 5 is restricted to a substantially constant level so that stable, sure sealing performance is secured.

The right-hand side of the projecting central portion of the plate 15 and that of the crimped portion 2e of the case 2 are simultaneously located in contact with the wall surface 1b of the housing 1. For that reason, although the case 2 is loosely fitted with the clearance C in the hole 1a of the housing 1, as mentioned above, the case is fixed more stably than a lip seal device in which only the right-hand side of the crimped portion of a case is located in contact with the wall surface of a housing.

Since the sealing surface of the first lip seal 3 is provided with the annular groove 3a, the thickness of the lip seal at the place of the annular groove is reduced. Therefore, the lip seal is more likely to be deformed at the location of the annular groove when the lip seal receives the pressure of the sealed fluid. At the time of the deformation, joints 7a and 7b at the annular groove 3a are brought into higher pressure contact with the outside circumferential surface of the rotary shaft 5 so that the contact surface of the joints 7a on the rotary shaft is shaped as a line and the contact surface of the joint 7b on the rotary shaft is shaped as a belt, each extending around the entire circumference of the shaft. Two annular contact surfaces are thus obtained by providing the single annular groove 3a, so as to produce a double sealing effect.

When the rotary shaft 5 is rotated, the left-hand edge of the first sealing surface 6a tends to slightly separate up from the outside circumferential surface of the rotary shaft 5 because the contact force Pf of the first sealing surface on the rotary shaft is set to be relatively low. If the joint 7a were shaped as a smooth curved surface, the line of circumferential contact of the joint 7a on the rotary shaft 5 would likely fluctuate in the axial direction of the rotary shaft at the time of the rotation thereof. Thus, the circumferential line of contact would resemble a "warped" circle, rather than a "pure" circle. Therefore, the contact surface between the joint 7a and the rotary shaft would tend to extend discontinuously in the circumferential direction.

However, since the corner of the joint 7a of the subject invention is designed to be as sharp as possible and located in contact with the outside circumferential surface of the rotary shaft 5, the line of circumferential contact of the joint on the rotary shaft is less likely to fluctuate in the axial direction of the rotary shaft. Therefore, the contact surface of the joint 7a will likely remain continuous in the circumferential direction of the rotary shaft 5 to thereby suppress the leaking of the sealed fluid. In other words, the quantity of the sealed fluid which leaks into the annular groove 3a along the first sealing surface 6a can be desirably regulated in terms of the magnitude of the tight contact force Pf of the first sealing surface 6a and the sharpness of the corner of the joint 7a.

It would be desireable from a viewpoint of the prevention of leakage of the sealed fluid to make the corner of the rear joint 7b sharp. However, the effect of lubrication by the sealed fluid would be reduced resulting in the roughening of the second sealing surface 6b. Therefore, the joint 7b is shaped as a smooth curved surface to introduce the sealed fluid as a lubricant to the second sealing surface 6b.

Since the contact force Pf of the front sealing surface 6a on the rotary shaft 5 is set to be weaker than the contact force Pr of the rear sealing surface 6b on the rotary shaft an appropriate quantity of the sealed fluid is allowed to leak along the first sealing surface 6a to be supplied to the second sealing surface 6b. Therefore, the wear of the second sealing surface is prevented to maintain the sealing performance thereof high for a long period of time. Since the contact force Pr of the second sealing surface 6b is set to be relatively strong, the sealing performance of the second sealing surface is sufficiently maintained. The above-mentioned double sealing effect can thus be maintained for a long period of time.

Since the sealed fluid is hardly supplied as a lubricant to the second lip seal 4, the tight contact force $P_2$ of the second lip seal is set to be the weakest so as to prevent the wear thereof.

Although the cross section of the annular groove 3a is shaped as the semicircle slightly deformed toward the sealed fluid in the above-described embodiment, the present invention is not confined thereto but may be otherwise embodied so that the cross section of the annular groove is appropriately shaped as a simple semicircle, a semicircle slightly deformed in the direction reverse to the sealed fluid, of the like.

Since the center line of the sealing member 11 and that of the annular groove 3b of the first lip seal 3 are located in the vertical plane perpendicularly intersecting the axis of the rotary shaft 5, as described above, the case 2 is prevented from being swung during the rotation of the rotary shaft 5. When the rotary shaft 5 is being rotated, the large-diameter portion 2a of the case 2 supporting the lip seals 3 and 4 at the outer circumferential portions thereof is displaced in the radial direction of the lip seal device due to the whirl, deflection or the like of the rotary shaft. If the annular groove 10 and the sealing member 11 were located at the right-hand side (as to FIG. 3) of the large-diameter portion 2a of the case 2, the case would be swung or tilted about the sealing member 11 due to the whirl, deflection or the like of the rotary shaft 5 so as to misalign the lip seals 3 and 4. For that reason, the tight contact portions of the sealing surfaces 6a and 6b would be displaced in the axial direction of the lip seal device.

The displacement of the lip seal device results in a discontinuous circumferential contact between the sealing surfaces 6a and 6b and the rotary shaft and thereby deteriorate the sealing performance thereof. However, according to the subject invention, the center line of the sealing member 11 and that of the annular groove 3a of the first lip seal 3 are located in the vertical plane perpendicularly intersecting the axis of the rotary shaft 5. Therefore, the swinging and tilting of the case 2 are prevented even if the case is displaced in the radial direction of the lip seal device due to the whirl, deflection or the like of the rotary shaft. For that reason, the misalignment of the lip seals 3 and 4 is prevented to thereby maintain each of the contact portions of the sealing surfaces 6a and 6b continuous in the circumferential direction of the lip seal device to avoid the deterioration of the sealing performance thereof.

However, the center line of the sealing member 11 and that of the annular groove 3a of the first lip seal 3 do not need to be exactly located in the vertical plane perpendicularly intersecting the axis of the rotary shaft 5. What is necessary is that the contact surfaces of the sealing member 11 and the housing 1 or those of the sealing member and the case 2, and the contact portions of the rotary shaft 5 and the sealing surfaces 6a and 6b of the first lip seal 3, which have the stronger tight contact force, are partially overlapped with each other in the axial direction of the rotary shaft.

Figure 6:
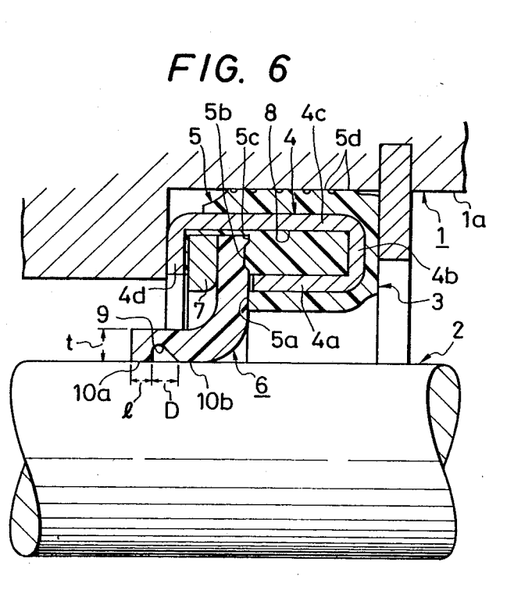
FIG. 6 shows a sectional view of still another embodiment of the present invention.

FIG. 6 shows a lip seal device which is still another embodiment and has only one lip seal. As shown in FIG. 6, a rotary shaft 2 is rotatably supported and extends through the stepped hole 1a of a housing 1. The gap between the outside circumferential surface of the rotary shaft 2 and the inside circumferential surface of the housing 1 is sealed by the lip seal device 3 comprising four member including case 4 made of metal, a sealing member 5 made of rubber or synthetic resin, the lip seal 6 made of rubber or synthetic resin, and a spacer 7 made of a metal.

The case 4 is annularly shaped to surround the rotary shaft 2. The cross section of the case 4 comprises an inner axial portion 4a located in an inner position and extending in the axial direction of the lip seal device 3, a first radial portion 4b extending outwardly in the radial direction of the device from the right-hand end (as to FIG. 6) of the inner axial portion, an outer axial portion 4c extending from the radially outer end of the first radial portion in parallel with the inner axial portion and a second radial portion 4d extending inwardly in the radial direction of the device from the left-hand end (as to FIG. 6) of the outer axial portion. The cross section of the case is nearly shaped as a rectangular ring cut at the left-hand inner corner thereof.

Before the lip seal 6 and the spacer 7 are assembled in the lip seal device, the second radial portion 4d and outer axial portion 4c of the case 4 extend in the same axial direction. After the lip seal 6 and the spacer 7 are assembled in the lip seal device 3, the second radial portion 4d of the case 4 is bent inwardly in the radial direction of the device so that the cross section of the case is nearly shaped as the rectangular ring as mentioned above.

The sealing member 5 is attached to the case 4 by vulcanization or adhesion, and continuously covers the outside of the outer axial portion 4c of the case 4, the outside of the first radial portion 4d thereof and the inside of the inner axial portion 4a thereof. The sealing member 5 fills a case opening 8 surrounded by the inner axial portion 4a, the first radial portion 4b and the outer axial portion 4c, and continuously covers the inside of the outer axial portion 4c and the inside of the second radial portion 4d extending continuously thereto.

The left-hand (as to FIG. 6) of the portion of the sealing member 5, which fills the case opening 8, acts as a support surface 5a which pinch-holds the outer circumferential portion of the lip seal 6 in cooperation with the spacer 7 as the outer circumferential portion of the lip seal is oriented in the radial direction of the lip seal device 3. The spacer 7 is supported at the left-hand side thereof by the second radial portion 4d bent inwardly in the radial direction of the lip seal device. The support surface 5a supporting the lip seal 6 has a projection 5b extending to the lip seal outside the inner axial portion 4a of the case with regard to the radial direction of the lip seal device 3 and continuously extending in the circumferential direction of the device, and also has an annular groove 5c adjacent to the projection and located outside thereof with regard to the radial direction of the lip seal device.

As a result, when the outer circumferential portion of the seal 6 is pinch-held by the support surface 5a and the spacer 7, the projection 5b is elastically and smoothly deformed more than the other part of the support surface 5a while being partially displaced into the annular groove 5c. For that reason, even if the elasticity of the sealing member 5 is reduced due to the aging thereof, the contact of the projection 5b and the lip seal 6 is sufficiently maintained to prevent a sealed fluid, for a long period of time, from leaking between the spacer 7 and the left-hand side of the lip seal 6 and between the right-hand side of the lip seal and the support surface 5a of the seal 5.

Since the lip seal 6 is pinch-held by the spacer 7 and the left-hand side of the inner axial portion 4a of the case 4 inside the projection 5b of the sealing member 5 with regard to the radial direction of the lip seal device 3, the pinch-holding is maintained in a prescribed state even if the sealing member 5 ages. For that reason, the pinch-holding force on the lip seal 6 is prevented from subsiding due to the aging of the sealing member 5 to thereby prevent the lip seal from rotating along with the rotation of the rotary shaft 2.

Since the lip seal 6 is pinch-held by the spacer 7 and the left-hand side of the inner axial portion 4a of the case 4, the firmly pinch-held position of the lip seal can be set nearest the rotary shaft 2 or, to be specific, at the innermost surface of the spacer 7. For that reason, the curved portion of the lip seal 6 is prevented from becoming likely to deform, to displace the sealing surface of the lip seal of the rotary shaft 2 in the axial direction of the lip seal device, to roughen the sealing surface or to shorten the life of the seal lip, as in an exemplary case the lip seal is pinch-held outside the middle portion of the spacer.

Since the thickness of the portion of the sealing member 5, which is located on the left-hand end surface of the inner axial portion 4a of the case 4, is as small as 0.1 to 0.5 mm, the pinch-holding force on the lip seal 6 does not substantially subside even if the sealing member 5 ages. Besides, the small-thickness portion of the sealing member 5 prevents the lip seal 6 form being damaged by the left-hand end surface of the inner axial portion 4a made of a metal.

The portion of the sealing member 5, which covers the outside of the outer axial portion 4c of the case 4, is provided with a plurality of annular projections 5d located at prescribed intervals, each extending continuously in the circumferential direction of the lip seal device 3. The annular projections 5d are press fitted on the inside circumferential surface of the housing 1 to keep the portion of the sealing member 5 and the inside circumferential surface of the housing liquid-tight to each other.

The inner circumferential portion of the lip seal 6 is curved toward the sealed fluid, or leftward (as to FIG. 6). The right-hand side (as to FIG. 6) of the inner circumferential portion is located in elastic contact with the outside circumferential surface of the rotary shaft 2 by the elasticity of the lip seal. Therefore, the sealed fluid present on the left-hand side of the lip seal is prevented from leaking to the atmosphere present on the right-hand side of the lip seal.

Figure 7:
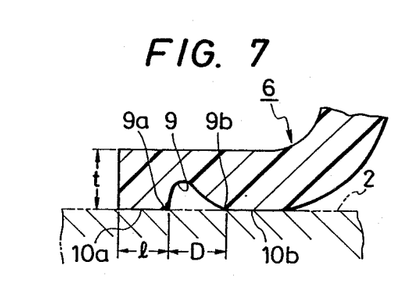
FIG. 7 shows an enlarged view of a major part of the lip seal device shown in FIG. 6.

The sealing surface of the lip seal 6 on the rotary shaft 2 is provided with an annular groove 9 extending continuously in the circumferential direction of the lip seal device 3 and dividing the sealing surface into a first sealing surface 10a, between the annular groove and the sealed fluid, and a second sealing surface 10b, between the annular groove and the atmosphere. The first sealing surface 10a is smoother than the second sealing surface 10b. As shown in FIG. 7, the cross section of the annular groove 9 is shaped as a semicircle slightly deformed toward the sealed fluid. The corner of the joint 9a of the annular groove 9 and the first sealing surface 10a is made nearly rectangular so that the corner is as sharp as possible. The joint 9b of the annular groove 9 and the second sealing surface 10b is shaped as a smooth curved surface.

Since the sealing surface of the lip seal 6 is provided with the annular groove 9, the thickness of the portion of the lip seal at the groove is reduced to make it easy for the portion to be deformed when the lip seal receives the pressure of the sealed fluid. As a result of the deformation, both the joints 9a and 9b are more strongly pushed against the outside circumferential surface of the rotary shaft 2. Therefore, the contact surfaces of the joints 9a and 9b on the rotary shaft are shaped as lines and belts, respectively, each extending endlessly in the circumferential direction of the rotary shaft. The two annular contact surfaces are thus provided by the single annular groove 9, to produce a double sealing effect.

When the rotary shaft 2 is rotated, the first sealing surface 10a tends to slightly separate up from the outside circumferential surface of the rotary shaft. If the joint 9a were shaped as a smooth curved surface, the line of the circumferential contact of the joint 9a on the rotary shaft would likely fluctuate in the axial direction of the rotary shaft. Thus, the circumferential line of contact would resemble a "warped" circle, rather than a "pure" circle. Therefore, the contact surface between the joint 9a and the rotary shaft would tend to extend discontinuously in the circumferential direction of the rotary shaft resulting in excess leakage.

However, since the corner of the joint 9a of the subject invention is made as sharp as possible and located in contact with the outside circumferential surface of the rotary shaft 2, the position of the contact portion of the joint on the rotary shaft is less likely to fluctuate in the axial direction of the rotary shaft. Therefore, the circumferential contact surface of the joint 9a on the rotary shaft 2 is continuous to suppress the leaking of the sealed fluid.

Since the other joint 9b is located outside the joint 9a with regard to the axial direction of the lip seal device 3, the circumferential continuous contact surface of the joint 9b on the rotary shaft 2 can be maintained better than that of the joint 9a. If the corner of the joint 9b were made sharp, it would be desirable from a viewpoint of the prevention of leakage of the sealed fluid but the sealed fluid could not be expected to lubricate as necessary to increase the life of the second sealing surface 10b. Therefore, the joint 9b is shaped as the smooth curved surface to introduce the sealed fluid as a lubricant to the second sealing surface 10b.

Since the first sealing surface 10a is smoother than the second sealing surface 10b, the first sealing surface conforms to outside circumferential surface of the rotary shaft 2 better than the second sealing surface prior to the initial rotation of the rotary shaft 2 for the first after the installation of the lip seal device 3 in the housing 1. Therefore, the first sealing surface performs a good sealing action.

When the rotary shaft 2 is rotated for the first time after the installation of the lip seal device 3 in the housing 1, the second sealing surface 10b, whose smoothness is lower than that of the first sealing surface 10a, quickly conforms to the outside circumferential surface of the rotary shaft due to the initial wear thereof. Therefore, the second sealing surface conforms to the outside circumferential surface of the rotary shaft better than the first sealing surface when the rotation of the rotary shaft is stopped.

Since the first sealing surface 10a, having higher smoothness than the second sealing surface 10b, undergoes initial wear due to the rotation of the rotary shaft 2 less than the second sealing surface, the first sealing surface tends to remain in the initial state so as not to conform to the outside circumferential surface of the rotary shaft. Therefore, the second sealing surface 10b performs a better sealing action than the first sealing surface 10a shortly after the initial start of the rotation of the rotary shaft 2. In other words, though the second sealing surface 10b is made rough to easily conform to the outside circumferential surface of the rotary shaft 2, the first sealing surface 10a of higher smoothness performs the better sealing action while the second sealing surface remains in its initial rough condition.

It will be understood that advantages discussed herein associated with the groove formed in the single lip seal embodiment illustrated in FIGS. 6 and 7 apply equally to the two lip seal embodiments disclosed herein.

Figure 8:
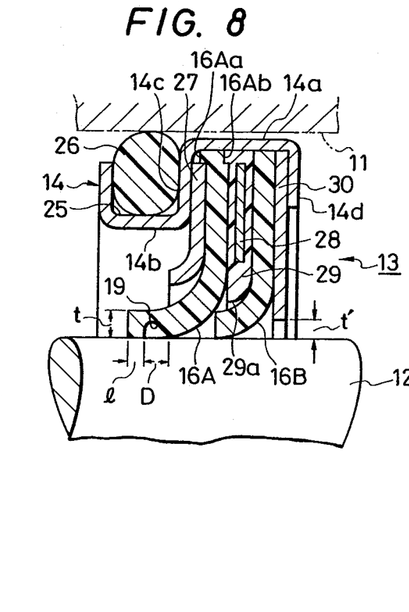
FIG. 8 shows a sectional view of a lip seal device which is still another embodiment of the present invention.

FIG. 8 shows a lip seal device 13 which is still another embodiment and has a first lip seal 16A and a second lip seal 16B. The inner circumferential portions of the first and the second lip seals 16A and 16B are curved toward a sealed fluid and put in sliding contact with the outside circumferential surface of a rotary shaft 12. The first lip seal 16A located at the side of the sealed fluid is provided with an annular groove 19 which has substantially the same constitution as the preceding embodiments. A first sealing surface 20a is provided at the left side (as to FIG. 8) of the annular groove 19, and a second sealing surface 20b is provided at the right side (as to FIG. 8) of the annular groove.

A cylindrical case 14, supporting the first and the second lip seals 16A and 16B at the outer circumferential portions thereof, has a large-diameter portion 14a, a small-diameter portion 14b and a wall 14c located between both portions. The left-hand end of the small-diameter portion 14b is bent outwardly in the radial direction of the lip seal device 13 so that an annular groove 25 is formed on the outside circumferential surface of the case 14. A sealing member 26 is fitted in the annular groove 25 to seal the gap between the case 14 and a housing 11. The right-hand end of the large-diameter portion 14a is bent inwardly in the radial direction of the lip seal device 13 so that a crimped portion 14d is formed. Between the wall 14c and the crimped portion 14d, a plate 27, the first lip seal 16A, a sealing member 29 embedded with a rigid plate 28 such as a metal washer, the second lip seal 16B and a plate 30 are pinch-held together in that order from the wall 14c.

The plate 27 is made of a metal so that the outside diameter thereof is smaller by a prescribed quantity than the inside diameter of the large-diameter portion 14a of the case 14. A projection 16A extending toward the sealed fluid is provided on the outer circumferential portion of the first lip seal 16Aa and engaged on the outside circumferential surface of the plate 27 to prevent the first lip seal from coming off. The outer circumferential portion of the first lip seal 16A is provided with an annular notch 16Ab opposite the projection 16Aa so that the sealing member 29 made of rubber is elastically deformed into the annular notch when the sealing member is fitted in the case 14.

The inside circumferential surface of the sealing member 29 is a curved surface 29a extending along the sealed-fluid-side curved surface of the second lip seal 16B so as to prevent the inner circumferential portion of the second lip seal from being displaced leftward (as to FIG. 8) in the axial direction of the lip seal device 13 more than a necessary quantity. As a result, the inner circumferential portion of the second lip seal 16B is prevented from being overlapped with the first lip seal 16A more than a prescribed quantity.

Although the plate 30, located at the right-hand end of the case 14, is made of a metal and shaped as a simple washer, the gap t' between the inside circumferential surface of the plate and the outside circumferential surface of the rotary shaft 12 is set to be small so as to prevent the inner circumferential portion of the second lip seal 16B form accidentally being bent back rightwardly.

In the lip seal device 13, the sealed fluid is sealed by the first lip 16A and a very small quantity of the sealed fluid, which has leaked through between the outer circumferential portion of the first lip seal 16A and the inside circumferential surface of the case 14, is sealed by the sealing member 29. Since the sealing member 29 is disposed behind the first lip seal 16A, the sealing member is kept from being exposed to the sealed fluid and is therefore prevented from deteriorating over time. Since the sealing member 29 is provided with the rigid plate 28 of prescribed thickness, the sealing member also functions as a spacer to prevent the inner circumferential sealing portions of both the lip seals 16A and 16B from being overlapped with each other more than a necessary quantity. Therefore, the effective sealing properties of the lip seals are secured and the total length of the lip seal device 13 is kept to a minimum.

It will be easily understood that the annular groove 19 of the first lip seal 16A in the lip seal device 13 produces the same effect as those in the preceding embodiments.

Figure 9:
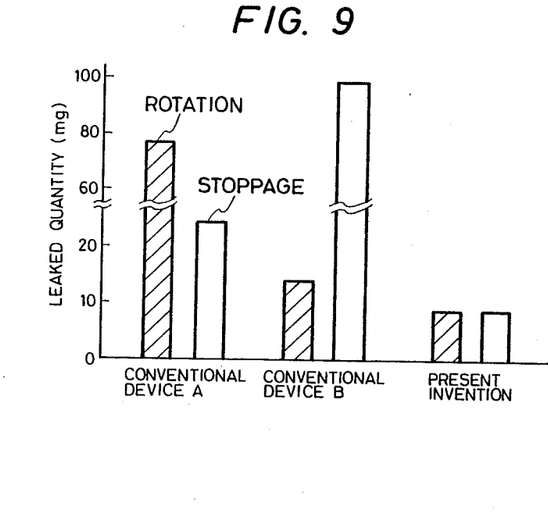
FIG. 9 shows a graph indicating the measured leakage from the lip seal device shown in FIG. 6, and those from conventional lip seal devices.

The effect of the present invention is described with reference to FIG. 9 showing the results of a test on the lip seal device 3 shown in FIG. 6, and conventional lip seal devices A and B for comparison. The conventional lip seal device A was the same as the lip seal device 3 of FIG. 6, except that the sealing surface of the lip seal had no annular groove. The other conventional lip seal device B was the same as the lip seal device 3 of FIG. 6, except that the sealing surface of the lip seal had no annular groove, but had a spiral groove extending in such a direction that a sealed fluid having leaked to the sealing surface was returned by the rotation of a rotary shaft. In the test, each of the lip seal devices 3, A and B was installed in a compressor of the swash plate type, and the leaked quantity of the sealed fluid was measured. After the rotary shaft of the compressor had been continuously rotated at the rate of 4,500 rpm for 24 hours with the inlet pressure and outlet pressure of the compressor set at 1.5 to 2.5 kg/cm² and 13 to 18 kg/cm², respectively, the rotary shaft was continuously stopped for 24 hours. The cycle of such rotation and stoppage was repeated four times, at each of which the total leaked quantity of the sealed fluid during the rotation and that of the sealed fluid during the stoppage were measured. As shown in FIG. 9, the leaked quantity of the sealed fluid with the lip seal device 3 was smaller than those of the sealed fluid with the conventional lip seal devices A and B. both during the rotation and during the stoppage. Therefore, the lip seal device 3 had better sealing performance than the conventional lip seal devices A and B.

Besides, the sealing performance of the lip seal devices which were the other above-described embodiments of the present invention was also measure in the same test. The thickness of each of the lip seals 5 and 16A of the devices was set at 1 mm and the distance 1 between the inner edge of each lip seal and each of the annular grooves 9 and 19 of the devices was changed in a range from 0.3 mm to 1.1 mm. It turned out that the sealing performance tended to improve as the distance 1 was increased. The same measurement was performed with regard to the width D of each of the annular grooves 9 and 19 as the width was changed in a range from 0.2 mm to 1.2 mm. It turned out that the sealing performance tended to improve as the width D was increased.

What is claimed is:

1. A lip seal device for sealing the gap between a housing and a rotary shaft, comprising:
   a case surrounding said rotary shaft;
   a plurality of lip seals fitted inside said case and including at least two lip seals which are a first and a second lip seals;
   support means for holding said lip seals on at least the outer circumferential portions thereof;
   and seal means located on the outside circumferential surface of said case, wherein said first lip seal is located nearer a sealed fluid than said second lip seal, the inner circumferential portions of said first and second lip seals being curved toward said sealed fluid and having sealing surfaces in sliding contact with the outside circumferential surface of said rotary shaft, and wherein the contact pressure of said second lip seal on said rotary shaft is set to be lower than that of said first lip seal on said rotary shaft.

2. A lip seal device according to the claim 1, wherein when said first and said second lip seals are in a free state before being put in actual use, the inside diameter of each of said first and second lip seals is made smaller than the outside diameter of said rotary shaft and the inside diameter of said second lip seal is made larger than that of said first lip seal so that the contact pressure of said second lip seal on said rotary shaft is set to be lower than that of said first lip seal on said rotary shaft.

3. A lip seal device according to the claim 1, wherein the flexibility of said second lip seal is higher than that of said first lip seal so that the contact pressure of said second lip seal on said rotary shaft is set to be lower than that of said first lip seal on said rotary shaft.

4. A lip seal device according to claim 1, wherein said support means for holding said lip seals on at least the outer circumferential portions thereof comprises two flanges provided in said case and extending toward said rotary shaft, said lip seals being disposed between said flanges.

5. A lip seal device according to the claim 4, wherein said support means for holding said lip seals on at least the outer circumferential portions thereof further comprises at least one plate extending toward said rotary shaft, said at least one plate being located between at least one of said flanges and said lip seal, wherein the inside diameter of said at least one plate is set to be smaller than that of said at least one flange, and the outside diameter of said at least one plate is set to be larger than the inside diameter of said at least one flange.

6. A lip seal device according to the claim 5, wherein the inner circumferential portion of said at least one plate has a bent form bent toward said at least one flange, said lip seals being held by the support means including said bent form.

7. A lip seal device according to claim 6, wherein one of said flanges is a crimped flange formed by crimping, said at least one plate being located at said crimped flange, and wherein said bent form is bent by the pressure of said crimping.

8. A lip seal device according to claim 6, wherein said bent form is provided by a previous bent plate with a bent portion.

9. A lip seal device according to the claim 1, wherein said support means comprises first and second flanges of said case and at least two plates, one of said plates being provided between a first flange and a first of said lip seals; a second of said plates being provided between a second flange and a second of said lip seals; the inner circumferential portion of said one plate being curved toward the sealed fluid more than said first lip seal, the inner circumferential portion of said second plate extending nearly inward in the radial direction of said lip seal device, said lip seals being held by said support means including both said plates.

10. A lip seal device according to claim 5, wherein said first lip seal is provided with a seal cover engaged on an outside circumferential surface of said one plate.

11. A lip seal device according to claim 10, wherein said support means further comprises a spacer extending toward the rotary shaft and provided between said first and said second lip seals to hold said lip seals, said spacer being made of a sealing material integrated with a rigid plate.

12. A lip seal device according to the claim 11, wherein said sealing material extends inwardly from said rigid plate of said spacer in the radial direction of said lip seal device so as to constitute an inner flexible portion which can be deformed to extend along the curves of said first and said second lip seals and hold said lip seals.

13. A lip seal device according to claim 1, wherein said seal means provided on the outside circumferential surface of said case is offset from the center of said case in the axial direction of said lip seal device.

14. A lip seal device according to the claim 13, wherein said seal means provided on he outside circumferential surface of said case is made of a sealing member fitted in an annular support groove of said case.

15. A lip seal device according to the claim 13, wherein said seal means provided on the outside circumferential surface of said case is made of a sealing member fitted in an annular support groove of said housing.

16. A lip seal according to the claim 13, wherein said seal means provided on the outside circumferential surface of said case is located near the side of said case opposite the sealed fluid.

17. A lip seal device according to the claim 16, wherein said case is loosely fitted with a prescribed clearance in said housing, said sealing member being press-fitted in between said case and said housing.

18. A lip seal device according to the claim 13, wherein said seal means provided on the outside circumferential surface of said case is located near the side of said case at the sealed fluid.

19. A lip seal device according to claim 18, wherein said case is loosely fitted with a prescribed clearance in said housing, said sealing member being press-fitted in between said case and said housing.

20. A lip seal device according to the claim 13, wherein the inner circumferential portion of said second plate located opposite said sealed fluid has a contact surface at the inner part of said bent form opposite said second lip seal, and wherein said flange located opposite said sealed fluid has an outside surface opposite said second lip seal, said contact surface and said outside surface being nearly contained in the same plane.

21. A lip seal device as claimed in any one of claims 1-20, wherein at least one of said sealing surface of said first and second lip seals has an annular groove extending continuously in the circumferential direction of said rotary shaft.

22. A lip seal device according to claim 21, wherein said sealing surface of said first lip seal has said annular groove extending continuously in the circumferential direction of the rotary shaft.

23. A lip seal device according to claim 5, wherein said at least one plate is provided at least on the side of the sealed fluid, the inner circumferential portion of said at least one plate is provided with a protector extending toward said sealed fluid, and said protector projects toward said sealed fluid in the axial direction of said lip seal device beyond the front end of said first lip seal.

* * * * *